United States Patent Office 2,714,122
Patented July 26, 1955

2,714,122
PRODUCTION OF DICHLOROHYDRINS

William C. Smith, Houston, John Anderson, La Porte, and Justin L. Bloom, Pasadena, Tex., assignors to Shell Development Company, Emeryville, Calif., a corporation of Delaware No Drawing. Application May 25, 1951,
Serial No. 228,372

3 Claims. (Cl. 260—633)

This invention relates to an improved process for reacting chlorine with allyl chloride to produce dichlorohydrin. "Dichlorohydrin" is a term employed herein to designate the isomers 1,2-dichloro-3-hydroxypropane and 1,3-dichloro-2-hydroxypropane.

The reaction formative of the dichlorohydrin isomers is one which goes forward only in aqueous solution, the over-all reactions involved in the process being:

(1) $H_2O + Cl_2 \longrightarrow HOCl + HCl$ (2) $CH_2=CHCH_2Cl + HOCl \longrightarrow$
$CH_2OH.CHCl.CH_2Cl$ (together with $CH_2Cl.CHOH.CH_2Cl$)
Dichlorohydrin Isomers Experience shows, however, that the foregoing reactions are accompanied by side reactions, principal among which are those leading to the formation of trichloropropane and tetrachloropropyl ether, namely:

(3) $CH_2=CHCH_2Cl + Cl_2 \longrightarrow CH_2Cl.CHCl.CH_2Cl$
Trichloropropane (4) $CH_2OH.CHCl.CH_2Cl + CH_2=CHCH_2Cl + Cl_2 \longrightarrow$
$CH_2Cl.CHCl.CH_2.O.CH_2CHCl.CH_2Cl + HCl$
Tetrachloropropyl ether These side reactions take place in both the aqueous phase of the system as well as in the organic phase thereof made up of the substantially water-insoluble trichloropropane and tetrachloropropyl ether by-products together with any undissolved allyl chloride, the latter compound being soluble to the extent of but 0.36% in water at 20° C. Approximately 7 to 8% of the allyl chloride is normally lost in aqueous phase by-product reactions, whereas the organic phase losses have ranged from about 5 to 20%, depending on the nature of the particular process employed. In an effort to keep organic phase by-product losses to a minimum, a variety of practices have been employed. In one such practice the reaction mixture containing allyl chloride and chlorine is kept as free as possible of any organic phase. In another, sometimes practiced in conjunction with the first, caustic is added to the reaction mixture so as to reduce the amount of free chlorine present in solution, it having been observed that free chlorine tends to dissolve preferentially in the organic phase and thereby accelerates by-product formation in that phase. At best, however, a practice of these known methods has not reduced the organic phase by-product losses to less than about 5 or 6%, based on the amount of allyl chloride employed.

According to the method disclosed in copending application Serial No. 228,216, filed May 25, 1951, organic phase by-product losses can be reduced to insignificant proportions by continuously maintaining the organic phase present in the system in a highly dispersed condition. However, since not all reaction systems lend themselves to an efficient practice of this method at all times particularly inasmuch as the apparatus by which dispersion is effected may not function efficiently from time to time, it is desirable to provide another method which may be practiced either in conjunction with the method disclosed in said copending application, or independently thereof, whereby organic phase by-product losses can be substantially reduced.

It is our discovery that the aforesaid by-product losses occurring in the organic phase can be greatly reduced by employing an excess of allyl chloride over the equimolar amount theoretically required for reaction with the chlorine. The amount of this allyl chloride excess need not be large and preferably is less than about 1%. Good results have been obtained by employment of allyl chloride excesses as small as 0.01%, though it is preferred that the amount of the excess be from about 0.05 to 1%. The use of an excess larger than about 2% (based on the total, or over-all amount of allyl chloride added) is generally to be avoided since such amounts increase raw material costs.

In carrying out the process of the present invention, the allyl chloride and chlorine reactants are added to an aqueous reaction medium in the desired proportions, the usual practice being either to add the reactants simultaneously, or to add the chlorine to an aqueous solution to which the allyl chloride has already been added. Thus, in one method of operation, the allyl chloride and chlorine are simultaneously added to a stirred body of aqueous reaction mixture until the desired concentration of dichlorohydrin is reached, whereupon further addition of the reactants is terminated. Dichlorohydrin can then be removed from the resulting solution by distillation or other separation method, or the entire solution can be subjected to a subsequent treatment, if desired. This (batch) method of operation can be converted to one of continuous operation by adding make-up water as the reaction continues, while continuously withdrawing a product stream from the reactor vessel.

In another method of continuous operation, the allyl chloride and chlorine reactants are added to an aqueous reaction mixture as the latter is pumped through a conduit system. Here, the normal practice is to first add the allyl chloride to the circulating stream at a given rate, with the chlorine then being added downstream from the point of allyl chloride addition at a rate so adjusted as to provide the desired excess of allyl chloride in the reaction mixture. In such a system the reaction zone is that which lies between the point of chlorine introduction and that at which the product stream is withdrawn from the conduit. The aqueous reaction mixture present in the conduit may, if desired, be recycled through the system, in which case make-up water is continuously added as a product stream is withdrawn at a point sufficiently removed from the point of chlorine introduction as to permit of complete reaction between the allyl chloride and the chlorine. The period in which the reactants need be maintained in the reaction zone need not be long, for the reaction is normally complete in but one or two seconds, or less.

In still another method of continuous operation the allyl chloride and chlorine are continuously added to separate aqueous streams which are then brought together in a reactor. In this method of operation the product stream flowing out of the reactor may itself be divided, with a portion being sent to product recovery while the balance, along with make-up water, provides the aqueous streams to which the allyl chloride and chlorine are added. The system described below in the examples, where the allyl chloride is fed directly into the reactor and the chlorine and make-up water are added to the recycle stream before the latter reaches the reactor, is a variant of this method.

Once the general method of operation has been selected and the mole ratio of allyl chloride to chlorine established, the other conditions of the reaction may be varied within relatively wide limits. Thus, increasing the dilution of the solution has the effect of reducing aqueous phase by-product formation, though the point is eventually reached where the costs of handling the added water in the product stream outweigh any gain in yield experienced by further diluting the solution. Preferably, there are employed from about 10 to 50 volumes of water for each volume of allyl chloride. That is to say, in batch operations allyl chloride is added to the aqueous reaction mixture until one volume of allyl chloride has been added for each 10 to 50 volumes of water present, whereas in continuous methods of operation, where make-up water is continuously fed to the aqueous reaction mixture, one volume of allyl chloride is added for each 10 to 50 volumes of make-up water supplied the system.

The reaction between allyl chloride and chlorine can be conducted within a wide temperature range and under atmospheric, subatmospheric or superatmospheric pressures. In general, reaction temperatures between 10° and 90° C. can be employed. The reaction is somewhat exothermic in nature, and in most cases good results are obtained (particularly in continuous methods of operation) by permitting the system to come to equilibrium at a temperature between about 25 and 75° C.

The benefits obtained by employing an excess of allyl chloride are particularly great in those systems wherein no caustic is added to the reaction mixture. That is to say, organic phase by-product reactions are more extensive at conditions of low pH (0.5 to 1.5) than is the case where the pH is adjusted upwardly by addition of caustic. However, even at a pH as high as 3.5, the yield of dichlorohydrin is materially improved by use of an excess of allyl chloride as disclosed herein.

The process of the present invention is illustrated by the following examples:

*Example I*

In this operation there is employed a system having a reactor comprising a stirred vessel into which allyl chloride and an aqueous recycle stream containing chlorine are continuously introduced. In carrying out the operation of the aqueous reaction mixture is continuously withdrawn from the reactor, a portion of said mixture being sent to product recovery while the balance, less any organic phase which can be readily separated as the liquid passes through a settling chamber, is provided with chlorine and recycled to the reactor along with make-up water added at a rate sufficient to maintain a relatively constant amount of liquid in the system. Within the system, conditions are so adjusted as to provide a recycle/make-up water ratio of approximately 20/1, with the allyl chloride being added to the liquid in the reactor at a rate of approximately one volume for each 26 volumes of make-up water supplied to the system, the amount of allyl chloride added in this manner being approximately 0.93 gram mole per hour. Chlorine is added to the make-up water in approximately this same amount, i. e., 0.93 gram mole per hour. The temperature of the reaction mixture is maintained at ca. 31–33° C., and the pH of the mixture is 0.4. Under these conditions, it is found that the yield of dichlorohydrin is approximately 86%.

The operation of the foregoing paragraph is now repeated but with the chlorine addition being curtailed to provide a 0.2–0.3% excess of allyl chloride. Under these conditions it is found that the yield of dichlorohydrin is increased to approximately 91%. In other words, the amount of allyl chloride lost as a result of by-product formation has been reduced by 36%. When, on the other hand, a like excess of chlorine is employed, the yield of dichlorohydrin falls to 80%.

*Example II*

The operations described above in Example I are repeated, but in this case with caustic being added to the recycle stream in an amount sufficient as to raise the pH of the system to a value of approximately 2. It is now found that by using 0.3% excess allyl chloride the yield of dichlorohydrin is 92%, whereas the yield is approximately 87–88% when equimolar amounts of allyl chloride and chlorine are used, and 81% when a 0.3% molar excess of chlorine is employed. By raising the pH of the system still further (to a value of 3.5) it is found that the use of this same excess of allyl chloride makes it possible to obtain a dichlorohydrin yield of 93% as contrasted with a yield of approximately 88–90% when equimolar amounts of allyl chloride and chlorine are used, and 87% when using a 0.3% excess of chlorine.

The invention claimed is:

1. In a process for producing dichlorohydrin wherein there is continuously recycled through a reactor system an aqueous reaction mixture to which make-up water is continuously added and from which a product stream is continuously withdrawn, the steps comprising continuously adding allyl chloride in the liquid phase and chlorine to said mixture, with the allyl chloride being added in an excess of about 0.01 to 2% over the equimolar amount theoretically required for reaction with the chlorine.

2. The process of claim 1 wherein the amount of the allyl chloride excess is from 0.05 to 1%.

3. In a process for producing dichlorohydrin by reaction of allyl chloride in the liquid phase with chlorine in aqueous solution, the steps comprising circulating an aqueous reaction mixture through a conduit system; continuously adding make-up water to the circulating mixture; continuously adding allyl chloride and chlorine to the circulating mixture, with the allyl chloride being employed in from 0.01 to 1% excess over the equimolar amount theoretically required for reaction with the chlorine; retaining the resulting mixture in the system until reaction between the allyl chloride and chlorine is complete; continuously withdrawing from the system, as product, a portion of the mixture containing the reacted allyl chloride and chlorine; and recycling the balance of the mixture through the system.

References Cited in the file of this patent

UNITED STATES PATENTS

| | | |
|---|---|---|
| 1,477,113 | Essex et al. | Dec. 11, 1923 |
| 2,007,168 | Kautter | July 9, 1935 |
| 2,060,303 | Groll et al. | Nov. 10, 1936 |
| 2,566,355 | Neuhaus | Sept. 4, 1951 |
| 2,605,293 | Tymstra | July 29, 1952 |